United States Patent Office 2,825,724
Patented Mar. 4, 1958

2,825,724

DIAZOTIZING ARYL AMINES

Harold M. Chase and Alton L. Corpening, Danville, Va., assignors to Dan River Mills, Incorporated, Danville, Va.

No Drawing. Application July 13, 1955
Serial No. 521,929

2 Claims. (Cl. 260—141)

The present invention relates to the diazotization of refractory bases.

The term "refractory bases" has reference to those aryl amines which are neither readily soluble nor easily diazotizable in aqueous media and includes the following bases:

|   | Common Name | Chemical Name |
|---|---|---|
| 1 | Oil Yellow | o-aminoazotoluene. |
| 2 | Red 3GL Base | p-chloro-o-nitroaniline. |
| 3 |  | p-amino-azo-benzene. |
| 4 | Fast Orange 6R Base | o-nitro-aniline. |
| 5 | Scarlet 2G Base | 2,5 dichloroaniline. |

We are familiar with the Lubs Patent No. 2,209,985 wherein certain formamides are used in the diazotization of certain bases including some of those contemplated by the present invention. The present invention is an improvement on the Lubs patent providing a better and less expensive means of diazotizing difficultly diazotizable bases.

This invention is directed particularly to a method of using diacetone alcohol as a solvent for refractory bases wherein a non-ionic dispersing agent is used in combination therewith to maintain the dissolved base in a fine state of dispersion after it has been added to a water solution thereby making it particularly adaptable to easy diazotization.

Diacetone alcohol possesses the desirable solvent properties required for dissolving refractory bases and its high boiling point, low cost and availability make it appear commercially advantageous to use on a commercial scale in diazotizing these materials.

Prior attempts to use this especially desirable solvent have failed because even though it dissolved the refractory bases, on subsequent diazotization, the final product contained small amounts of tar.

It has now been found that tar-free diazotized products can be formed and diacetone alcohol can be successfully used as a solvent in the diazotization of refractory bases if a substantial portion of a non-ionic dispersing agent is added to the diacetone alcohol solution of the base. It appears that the dispersing agent keeps the solvent and base in a fine state of dispersion or suspension when it is added to an acid, water and ice mixture so that rapid and complete diazotization is obtained.

By a substantial amount of dispersing agent is meant an amount in the nature of about 20% by weight of the solution of base in diacetone alcohol. Of course, this amount may be varied without departing from the scope of the invention as greater amounts have no harmful effect and smaller amounts will tend to achieve the desired results although to lesser degrees, depending, of course, on how much the quantity is reduced.

Thus, according to the present invention refractory bases are dissolved in about one to two times their own weight of diacetone alcohol with a substantial portion of a non-ionic dispersing agent and this solution is poured into a mixture of water, ice and acid to form what appears to be a finely divided dispersion. On adding sodium nitrite solution the base is rapidly and completely diazotized to give a tar free solution.

The invention will be better understood by reference to the following examples.

*Example 1*

Ten grams of p-chloro-o-nitroaniline (Red 3 GL Base) was dissolved in 15 cc. of diacetone alcohol to which 5 grams of Triton X–100 (said by its manufacturer to be an ethylene oxide condensation product of an alkylated phenol) had been added. This solution was poured all at once, with stirring, into a mixture containing 75 grams of ice, 24 cc. of 28% hydrochloric acid and 50 cc. of water. To this mixture, there was then added by a steady feed with stirring, a solution of 5 grams of sodium nitrite in 20 cc. of water.

The base was diazotized to a tar free solution in a few minutes. The temperature of the solution did not rise above about 5–10° C. during the reaction.

This product was then neutralized with sodium acetate and used in the usual manner.

*Example 2*

Ten grams of p-amino-azo-benzene was dissolved at 56° C. in 15 cc. of diacetone alcohol to which 5 grams of Triton X–100 had been added. This solution was poured rapidly into 200 cc. of water to which 75 grams of ice and 18 cc. of 28% hydrochloric acid had been added. To this mixture, there was fed at moderate speed with vigorous stirring, a solution of 4 grams of sodium nitrite in 20 cc. of water. Diazotization was complete in 15 minutes at 5–10° C. and the product was ready for neutralization and use.

*Example 3*

Ten grams of o-nitroaniline (Fast Orange 6R Base) was dissolved at 35° C. in 10 cc. of diacetone alcohol to which there had been added 5 grams of Triton X–100. This solution was poured rapidly, with stirring, into a mixture containing 32 cc. of 28% hydrochloric acid, 65 grams of ice and 60 cc. of water. To this mixture there was gradually fed with vigorous stirring a solution of 5.5 grams of sodium nitrite dissolved in 20 cc. of water. Diazotization was complete in five to ten minutes at 5–10° C. and the tar free solution was ready for neutralization and use at will.

*Example 4*

Ten grams of 2,5-dichloroaniline (Scarlet 2G Base) was dissolved in 6 cc. of diacetone alcohol to which 4.5 grams of Triton X–100 had been added. This solution was poured into a mixture containing 43 cc. of 28% hydrochloric acid, 75 grams of ice and 40 cc. of water. To this mixture, there was fed from a burette over about 45 seconds, with stirring, a solution of 4.55 grams of sodium nitrite in 20 cc. of water. In several minutes, the solution cleared indicating that diazotization was complete. The temperature was then about 5° C.

*Example 5*

Ten grams of o-aminoazotoluene (4-o-tolylazo-o-toluidine) (Oil Yellow) was dissolved in 15 grams of diacetone alcohol to which 5 grams of Triton X–100 had been added. This solution was poured, all at once, with stirring, into a mixture containing 15.3 cc. of 28% hydrochloric acid, 200 grams of ice and 200 cc. of cold water. To this mixture there was fed gradually, with vigorous stirring, a solution of 3.15 grams of sodium nitrite in 20 cc. of cold water. Perfect diazotization was obtained in 15 minutes.

It will be understood that the particular diazotization technique, the specific amounts of ice, water, acid, sodium nitrite and such matters are not critical so far as this invention is concerned, as regulation of these items with respect to specific bases as to quantity and selection is commonly done by those skilled in the art.

Likewise, the use of the specific non-ionic dispersing agent disclosed in the examples is not critical as there are many, perhaps hundreds, of these products readily available in commercial quantities. However, the use of a non-ionic dispersing agent in combination with diacetone alcohol is the very gist of the invention.

We claim:

1. The method of diazotizing an aryl amine selected from the group consisting of o-aminoazotoluene, p-chloro-o-nitroaniline, p-aminoazo-benzene, o-nitro-aniline and 2,5 dichloroaniline, which comprises forming a solution of said base in from about 100% to 150% of its weight of diacetone alcohol and about 20% based on the total weight of the final solution of a non-ionic dispersing agent, mixing this solution with a mixture of ice, water and hydrochloric acid and thereafter adding sodium nitrite.

2. The method of diazotizing p-chloro-o-nitroaniline which comprises dissolving it in about 150% of its weight of diacetone alcohol and about 20% of its weight of an ethylene oxide condensation product of an alkylated phenol, pouring this solution into a mixture of ice, hydrochloric acid and water, and thereafter adding a solution of sodium nitrite.

References Cited in the file of this patent
UNITED STATES PATENTS

| | | |
|---|---|---|
| 2,013,180 | Koch | Sept. 3, 1935 |
| 2,209,985 | Lubs | Aug. 6, 1940 |
| 2,622,078 | Klaassens et al. | Dec. 16, 1952 |
| 2,643,175 | Salvin | June 23, 1953 |